(12) United States Patent
Dong et al.

(10) Patent No.: US 12,001,216 B2
(45) Date of Patent: Jun. 4, 2024

(54) CARPET DETECTION METHOD, MOVEMENT CONTROL METHOD, AND MOBILE MACHINE USING THE SAME

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Chuqiao Dong, Pasadena, CA (US); Dan Shao, San Gabriel, CA (US); Zhen Xiu, Chino Hills, CA (US); Dejun Guo, San Gabriel, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 433 days.

(21) Appl. No.: 17/334,834

(22) Filed: May 31, 2021

(65) Prior Publication Data

US 2022/0382293 A1 Dec. 1, 2022

(51) Int. Cl.
*G05D 1/02* (2020.01)
*G05D 1/00* (2006.01)
*G06N 3/04* (2023.01)
*G06T 7/55* (2017.01)

(52) U.S. Cl.
CPC ......... *G05D 1/0238* (2013.01); *G05D 1/0223* (2013.01); *G05D 1/0246* (2013.01); *G06N 3/04* (2013.01); *G06T 7/55* (2017.01); *G06T 2207/10024* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC ................................ G05D 1/0238; G06T 7/55
See application file for complete search history.

(56) References Cited

U.S. PATENT DOCUMENTS

| 2018/0276891 | A1* | 9/2018 | Craner | G08B 7/06 |
| 2018/0353043 | A1* | 12/2018 | Erkek | A47L 7/009 |
| 2020/0069134 | A1* | 3/2020 | Ebrahimi Afrouzi | A47L 9/0472 |
| 2020/0205628 | A1* | 7/2020 | Marutani | A47L 9/2826 |
| 2020/0374498 | A1* | 11/2020 | Sodhi | H04N 9/3176 |

(Continued)

FOREIGN PATENT DOCUMENTS

CN 111035327 A 4/2020

OTHER PUBLICATIONS

ISR for PCT/CN2022/078831.
Written opinions of ISA for PCT/CN2022/078831.

*Primary Examiner* — Jess Whittington

(57) ABSTRACT

Carpet detection using an RGB-D camera and mobile machine movement control based thereon are disclosed. Carpets and carpet curls are detected by obtaining a RGB-D image pair including an RGB image and a depth image through an RGB-D camera, detecting carpet and carpet-curl areas in the RGB image and generating a 2D bounding box to mark each area using a deep learning model, and generating groups of carpet and carpet-curl points corresponding to each of the carpet and carpet-curl areas by matching each pixel of the RGB image within each 2D bounding box corresponding to the carpet and carpet curl areas to each pixel in the depth image.

20 Claims, 10 Drawing Sheets

(56) References Cited

U.S. PATENT DOCUMENTS

2021/0031367 A1\* 2/2021 Mirzaei ................. G06V 10/56
2021/0133480 A1\* 5/2021 Rus ....................... G06F 16/587
2022/0335650 A1\* 10/2022 Lelowicz ................. G06T 7/75

\* cited by examiner

CARPET DETECTION METHOD, MOVEMENT CONTROL METHOD, AND MOBILE MACHINE USING THE SAME

BACKGROUND

1. Technical Field

The present disclosure relates to carpet detections, and particularly to a carpet detection method and a movement control method as well as a mobile machine using the same.

2. Description of Related Art

Mobile machines such as mobile robots and vehicles are often endowed with autonomous navigation capability so as to work in a more autonomous manner. Especially for mobile robots such as housework-robots and companion robots, because they will be used in the scenarios of daily life that will have carpets to affect their movements and even cause dangerous situations such as falling down, the detection of carpets is needed in the movement of the mobile robots.

Since the carpets have the characteristic of low height and are usually laid on the floor, for most sensor they are difficult to detect. Hence, in the existing methods for detecting carpets, a combination of many sensors is usually used, and the detections are inefficient and costly. In addition, for the mobile robots that move using wheels or have smaller height, carpet-curls will be prone to cause the dangerous situations, and the existing methods for detecting carpets do not particularly optimize the detection of carpel-curls. As a result, the existing methods for detecting carpets are inadequate to be used to navigate the mobile robots in the scenario with carpets.

Therefore, a carpet detection method capable of detecting both carpet and carpet-curls that can be used to navigate the mobile robots in the scenario with carpets is need.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
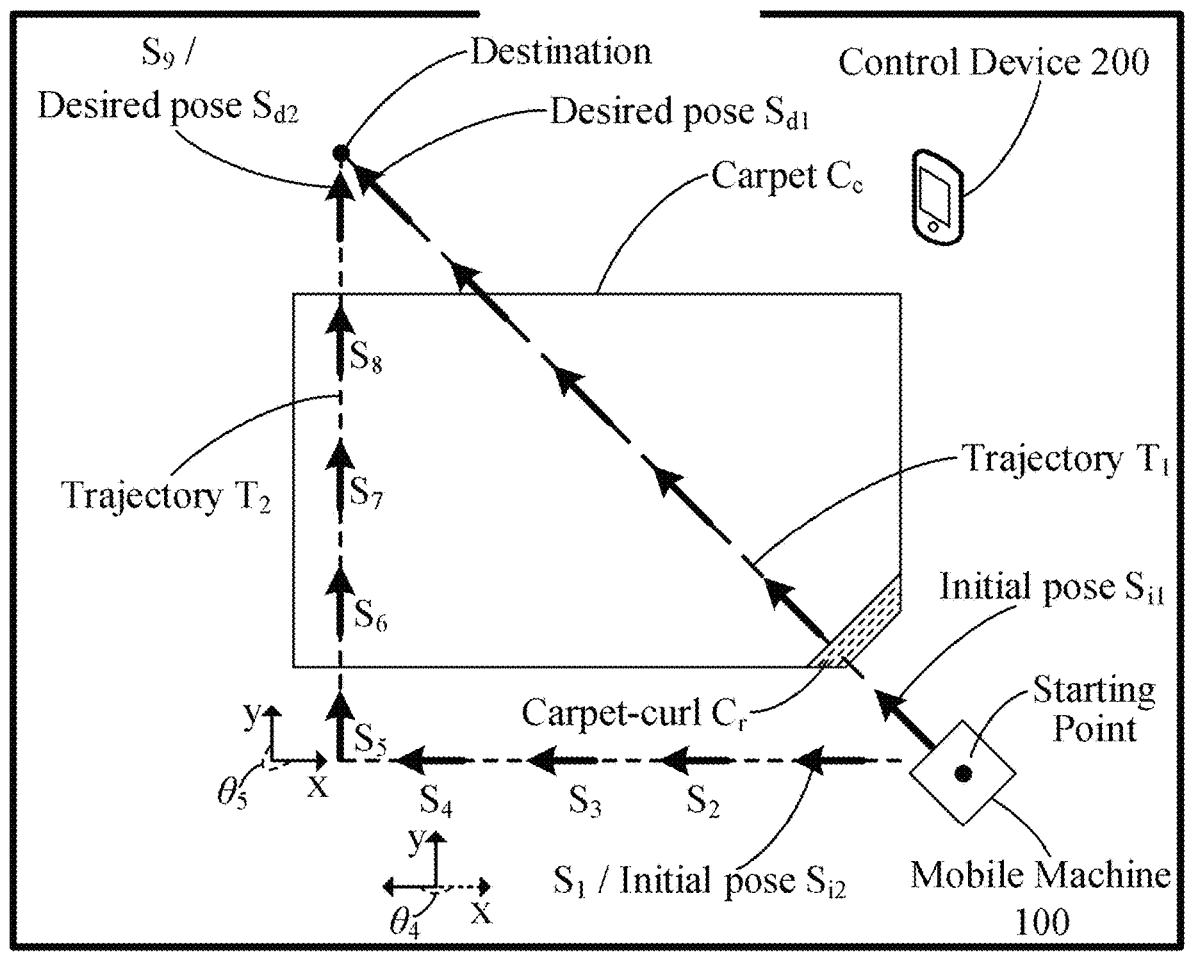
FIG. 1A is a schematic diagram of a scenario of navigating a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended a claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third"may include at least one of the feature either explicitly or implicitly. In the description of the present disclosure, the meaning of "a plurality" is at least two, for example two, three, and the like, unless specifically defined otherwise.

In the present disclosure, the descriptions of "one embodiment," "some embodiments" or the like described in the specification mean that one or more embodiments of the present disclosure can include particular features, structures, or characteristics which are related to the decriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to mobile machine navigating. As used herein, the term "mobile machine" refers to a machine such As a mobile robot or a vehicle that has the capability to move around in its environment. The term "carpet" refers to a textile floor covering typically consisting of an upper layer of pile attached to a backing (e.g., carpet, rug, and mat), and the term "carpet-curl" refers to the curl of a carpet on the edge of the carpet. The term "trajectory planning" refers to find a sequence of valid configurations that moves a mobile machine from the source to the destination and is parameterized by time, where "trajectory" denotes a sequence of poses with time stamp (cf. "path" denotes a sequence of poses or position without time stamp). The term "pose" refers to position (e.g., x and y coordinates on x and y axes) and posture (e.g., a yaw angle along z axis). The term "navigation" refers to the process of monitoring and controlling the movement of a mobile robot from one place to another, and the term "collision avoidance" refers to prevent or reduce the severity of a collision. The term "sensor" refers to a device, module, machine, or subsystem such as ambient light sensor and image sensor (e.g., camera) whose purpose is to detect events or changes in its environment and send the information to other electronics (e.g., processor).

FIG. 1A is a schematic diagram of a scenario of navigating a mobile machine 100 according to some embodiments of the present disclosure. The mobile machine 100 is navigated in its environment (e.g., a living room), while dangerous situations such as collisions and unsafe conditions (e.g., falling, extreme temperature, radiation, and exposure) may be prevented. In this indoor navigation, the mobile machine 100 is navigated from a starting point (e.g., the location where the mobile machine 100 originally locates) to a destination (e.g., the location of the goal of navigation which is indicated by a user U (not shown) or the navigation/operation system of the mobile machine 100), while a carpet $C_c$ may be passed through (i.e., the mobile machine 100 may be moved on the carpet $C_c$ during the navigation), and obstacles (e.g., carpet-curl $C_r$ of the carpet $C_c$, walls, furniture, humans, pets, and garbage) may be avoided so as to prevent the above-mentioned dangerous situations. The trajectory(s) (e.g., trajectory $T_1$ and trajectory $T_2$) for the mobile machine 100 to move from the starting point to the destination has to be planned so as to move the mobile machine 100 according to the trajectory(s). Each trajectory includes a sequence of poses (e.g., poses $S_1$-$S_9$ of trajectory $T_2$). It should be noted that, the starting point and the destination only represent the locations of the mobile machine 100 in the scenario shown in the figure, rather than the real beginning and end of the trajectory(s) (the real beginning and end of a trajectory should be a pose, respectively, e.g., initial poses $S_{i1}$, $S_{i2}$ and desired poses $S_{d1}$, $S_{d2}$ in FIG. 1A). In some embodiments, for realizing the navigation of the mobile machine 100, the map for the environment has to be built, the current position of the mobile machine 100 in the environment may have to be determined, and trajectories may be planned based on the built map and the determined current position of the mobile machine 100.

First initial pose $S_{i1}$ is the beginning of a trajectory $T_1$, and second initial pose $S_{i2}$ is the beginning of a trajectory $T_2$. First desired pose $S_{d1}$ is the last of the sequence of poses S in the trajectory $T_1$, that is, the end of the trajectory $T_1$. Second desired pose $S_{d2}$ is the last of the sequence of poses S in the trajectory $T_2$, that is, the end of the trajectory $T_2$. The trajectory $T_1$ is planned according to, for example, a shortest path in the built map to the user U. The trajectory $T_2$ is planned corresponding to a carpet detection (see FIG. 3A) performed by the mobile machine 100. In addition, the collision avoidance to obstacles in the built map (e.g., walls and furniture) or that detected in real time (e.g., humans and pets) may also be considered when planning, so as to accurately and safely navigate the mobile machine 100.

In some embodiments, the navigation of the mobile machine 100 may be actuated through the mobile machine 100 itself (e.g., a control interface on the mobile machine 100) or a control device 200 such as a remote control, a smart phone, a tablet computer, a notebook computer, a desktop computer, or other electronic device by, for example, providing a request for the navigation of the mobile machine 100. The mobile machine 100 and the control device 200 may communicate over a network which may include, for example, the Internet, intranet, extranet, local area network (LAN), wide area network (WAN), wired network, wireless networks (e.g, Wi-Fi network, Bluetooth network, and mobile network), or other suitable networks, or any combination of two or more such networks.

Figure 1B:
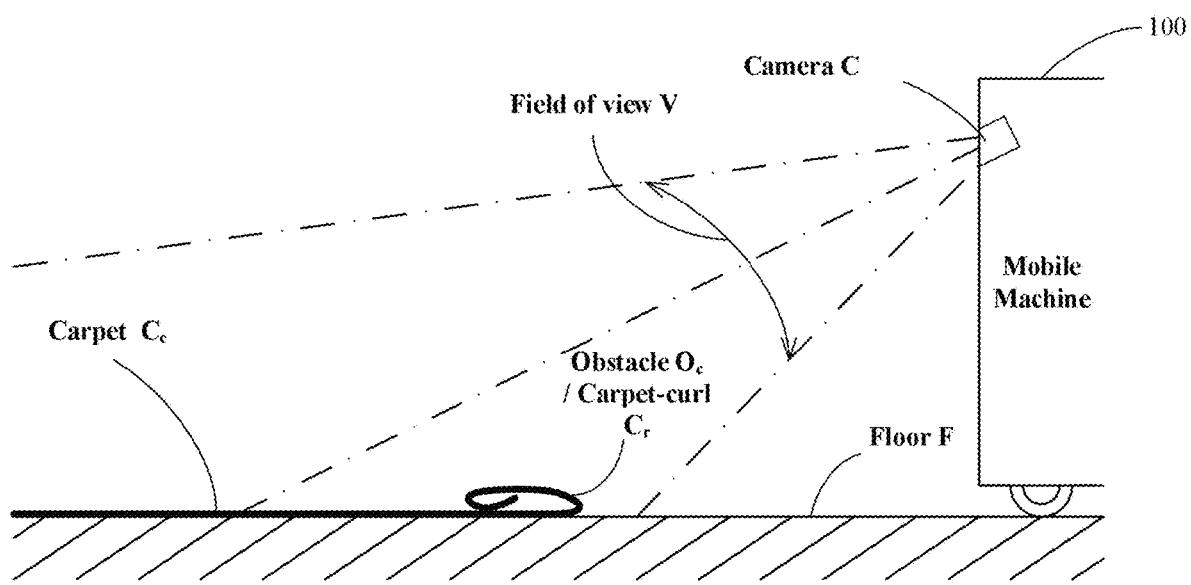
FIG. 1B is a schematic diagram of detecting carpets in the scenario of FIG. 1A.
Figure 2A:
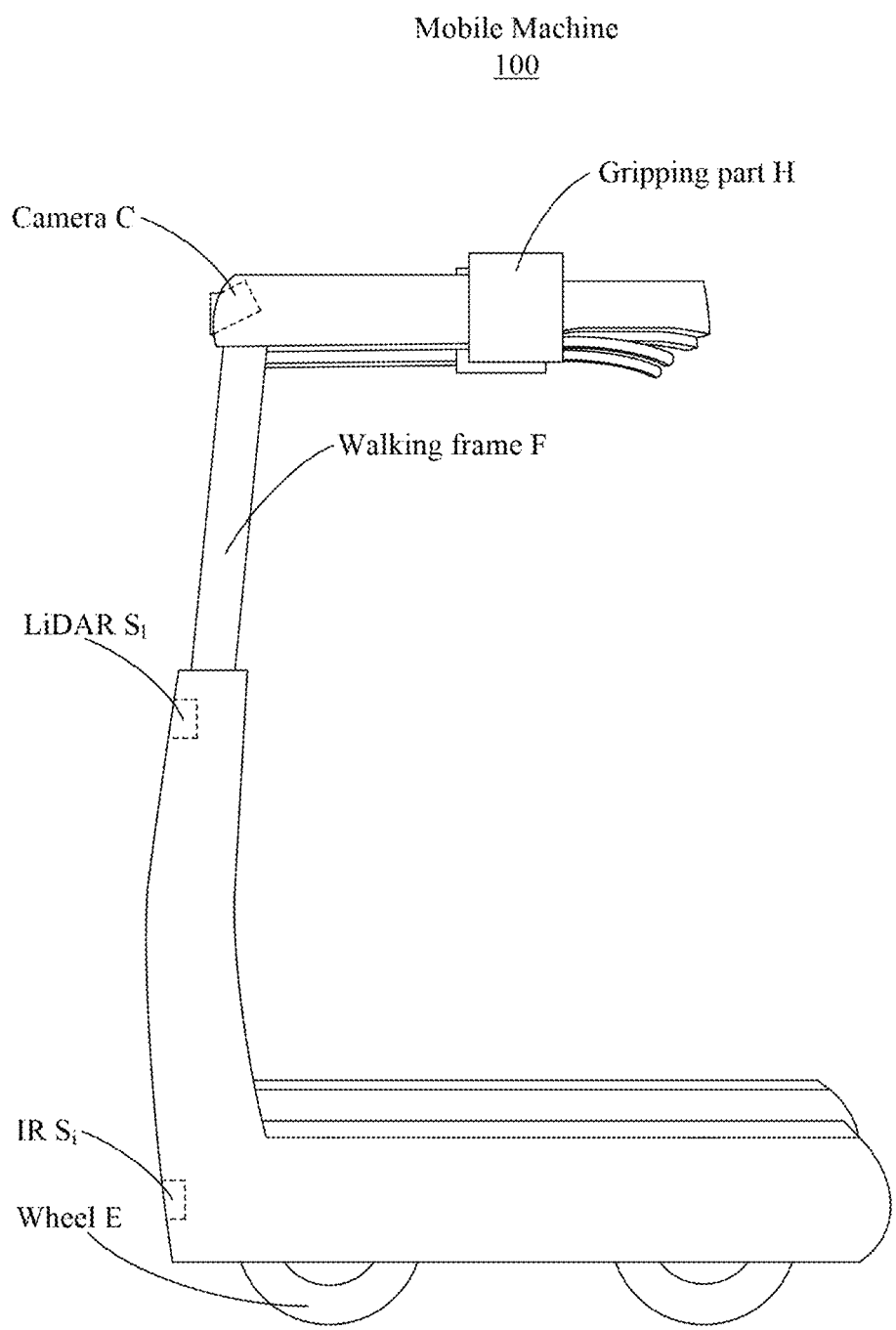
FIG. 2A is a perspective view of a mobile machine according to some embodiments of the present disclosure.

FIG. 1B is a schematic diagram of detecting carpets in the scenario of FIG. 1A. As shown in FIG. 1B, a field of view V of the RGB-D camera C covers both the carpet $C_c$ and a floor F. Through a carpet detection, both the carpet $C_c$ and a carpet-curl $C_r$ of the carpet $C_c$ can be detected. FIG. 2A is a perspective view of the mobile machine 100 according to some embodiments of the present disclosure. In some embodiments, the mobile machine 100 may be a mobile robot such as a mobility aid robot, which may include a walking frame F, gripping parts H, wheels E, and sensors including an RGB-D camera C, a LiDAR $S_l$, and IRs $S_i$. The RGB-D camera C is mounted on (an upper part of) as front side of the mobile machine 100 to face the direction that the mobile machine 100 moves forward, such that the field of view V able to cover where the mobile machine 100 is moving to, so as to detect the carpet $C_c$ and/or obstacles (e.g., the carpet-curl $C_r$ of the carpet $C_c$) when, for example, the mobile machine 100 moves forward. The height of the RGB-D camera C on the mobile machine 100 may be changed according to actual needs (e.g., larger height to have the larger field of view V and smaller height to have the smaller field of view V), and the pitch angle of the RGB-D camera C with respect to the floor F may also be changed according to actual needs (e.g., larger pitch angle to have the nearer field of view V and smaller pitch angle to have the farer field of view V). The LiDAR $S_l$ is mounted on (a middle part of) the front side, and the IRs $S_i$ are mounted on (a lower part of) the front side (e.g., two or more IRs $S_i$ mounted on the front side with an interval therebetween), so as to detect obstacles (e.g., wall, human, and the carpet-curl $C_r$ of the carpet $C_c$), and may also to detect the carpet $C_c$. The gripping parts H are attached to an upper edge of the walking frame F for the user U to grip, and the wheels E are attached to a bottom (e.g., a chassis) of the walking frame F for moving the walking frame F, so that the user U can be supported by the mobile machine 100 to stand and move with the assistance of the mobile machine 100. The height of the walking frame F may be manually or automatically adjusted by, for example, telescoping mechanisms in the walking frame F such as telescopic rods so that the gripping parts H meet a height convenient for the user U to grip. The gripping parts H may include a pair of handlebars disposed in parallel for the user U to grip through two hands and brake levers mounted on the handlebars for the user U to brake the mobile machine 100 through the two hands, and may also include related parts such as Bowden cables. It should be noted that, the mobile machine 100 is only one example of mobile machine, and the mobile machine 100 may have more or fewer pans than shown in above or below (e.g., have legs rather than the wheels E), or may have a different configuration or arrangement of the parts (e.g., have a single gripping part such as a grip bar). In other embodiments, the mobile machine 100 may be another kind of mobile machine such as a vehicle.

Figure 2B:
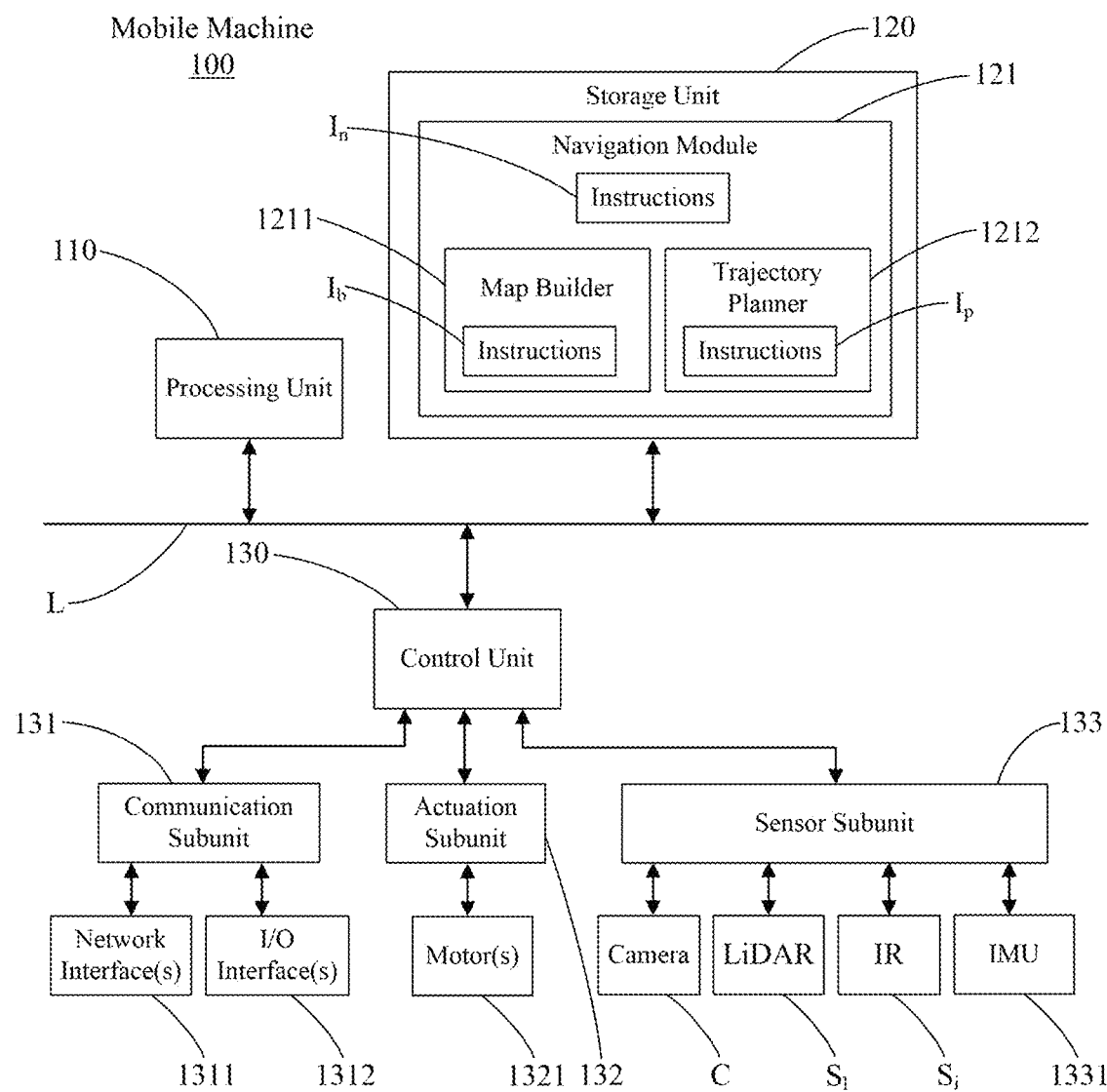
FIG. 2B is a schematic block diagram illustrating the mobile machine of FIG. 2A.

FIG. 2B is a schematic block diagram illustrating the mobile machine 100 of FIG. 2A. The mobile machine 100 may include a processing unit 110, a storage unit 120, and a control unit 130 that communicate over one or more communication buses or signal lines L. It should be noted that, the mobile machine 100 is only one example of mobile machine, and the mobile machine 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobile machine 100, which may be stored in the one or more memories (and the one or more non-transitory computer readable storage media).

The navigation module 121 in the storage unit 120 of the mobile machine 100 may be a software module (of the operation system of the mobile machine 100), which has instructions $I_n$ (e.g., instructions for actuating motor(s) 1321 of the mobile machine 100 to move the mobile machine 100) for implementing the navigation of the mobile machine 100, a map builder 1211, and trajectory planner(s) 1212. The map builder 1211 may be as software module having instructions $I_b$ for building map for the mobile machine 100. The trajectory planner(s) 1212 may be software module(s) having instructions $I_p$ for planning trajectories for the mobile machine 100. The trajectory planner(s) 1212 may include a global trajectory planner for planning global trajectories (e.g., trajectory $T_1$ and trajectory $T_2$) for the mobile machine 100 and a local trajectory planner for planning local trajectories (e.g., a part of the trajectory $T_2$ that includes poses $S_1$-$S_4$ in FIG. 1A) for the mobile machine 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory $P_g$, and other data collected by the mobile machine 100. For example, images may be collected through the RGB-D camera C of the mobile machine 100, and the collected images may be analyzed so as to identify obstacles (e.g., the obstacle $O_c$ in FIG. 1B), so that the local trajectory can be planned with reference to the identified obstacles, and the obstacles can be avoided by moving the mobile machine 100 according to the planned local trajectory.

Each of the map builder 1211 and the trajectory planner(s) 1212 may be a submodule separated from the instructions $I_n$ or other submodules of the navigation module 121, or a part of the instructions $I_n$ for implementing the navigation of the mobile machine 100. The trajectory planner(s) 1212 may further have data (e.g., input/output data and temporary data) related to the trajectory planning of the mobile machine 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobile machine 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g, high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device 200 via the network, I/O interface(s) 1312 (e.g., a physical button), and the like. The actuation subunit 132 is coupled to component(s)/device(s) for implementing the motions of the mobile machine 100 by, for example, actuating motor(s) 1321 of the wheels E and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

The mobile machine 100 may further include a sensor subunit 133 which may include a set of sensor(s) and related controller(s), for example, the RGB-D camera C, the LiDAR $S_l$, the IRs $S_i$, and an IMU 1331 (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

In addition to detecting the carpet $C_c$, the RGB-D camera C may be beneficial to detect small objects with rich features or obvious outlines (e.g., mobile phone and a puddle of water on the carpet $C_c$), and suspended objects with bigger upper part than lower part, for example, for a table with four legs, the RGB-D camera C can recognize the surface of the table while the LiDAR $S_l$ can only detect the four legs without knowing there is a surface in above. The IRs $S_i$ may be beneficial to detect small obstacles over 5 cm height. In other embodiments the number of the above-mentioned sensors in the sensors S may be changed according to actual needs, and the sensors S may include a part of the above-mentioned kinds of sensors (e.g., the RGB-D camera C and the LiDAR $S_l$) and may include other kinds of sensors (e.g., sonar).

In some embodiments, the map builder 1211, the trajectory planner(s) 1212, the sensor subunit 133, and the motor(s) 1321 (and the wheels E and/or joints of the mobile machine 100 coupled to the motor(s) 1321) jointly compose a (navigation) system which implements map building, (global and local) trajectory planning, and motor actuating so as to realize tho navigation of the mobile machine 100. In addition, the various components shown in FIG. 2B may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 3A:
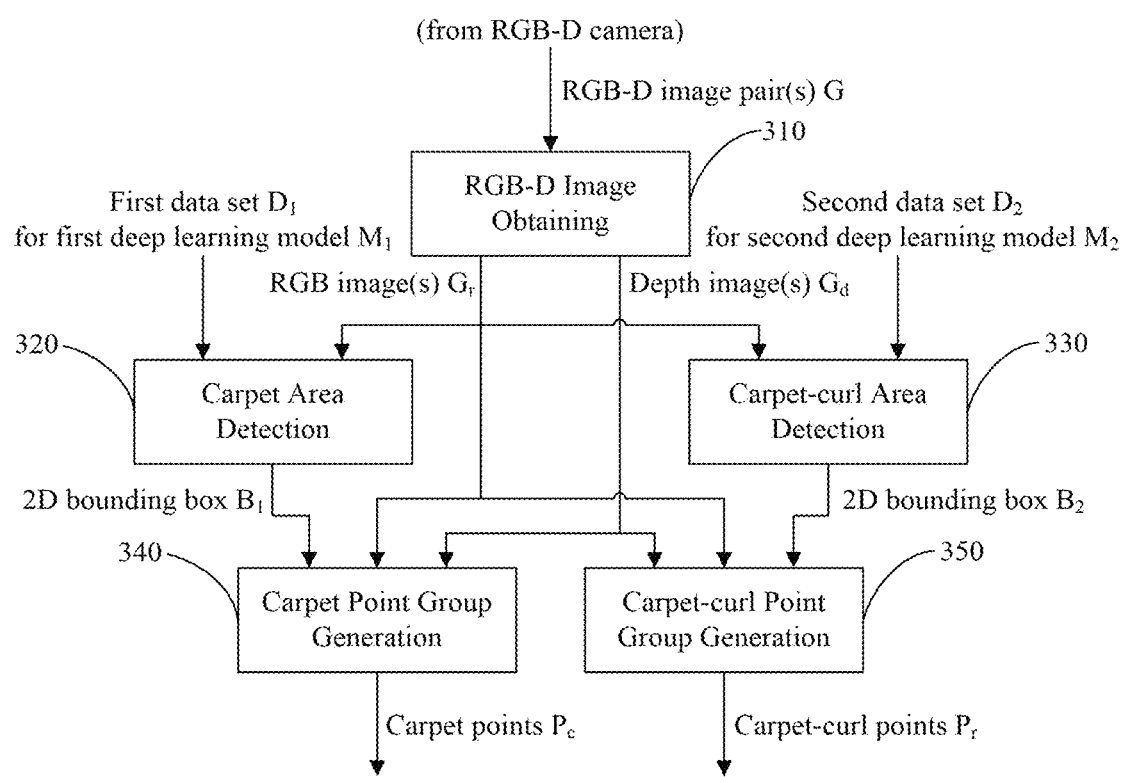
FIG. 3A is a schematic block diagram of an example of carpet detection performed by the mobile machine of FIG. 2A.
Figure 3B:
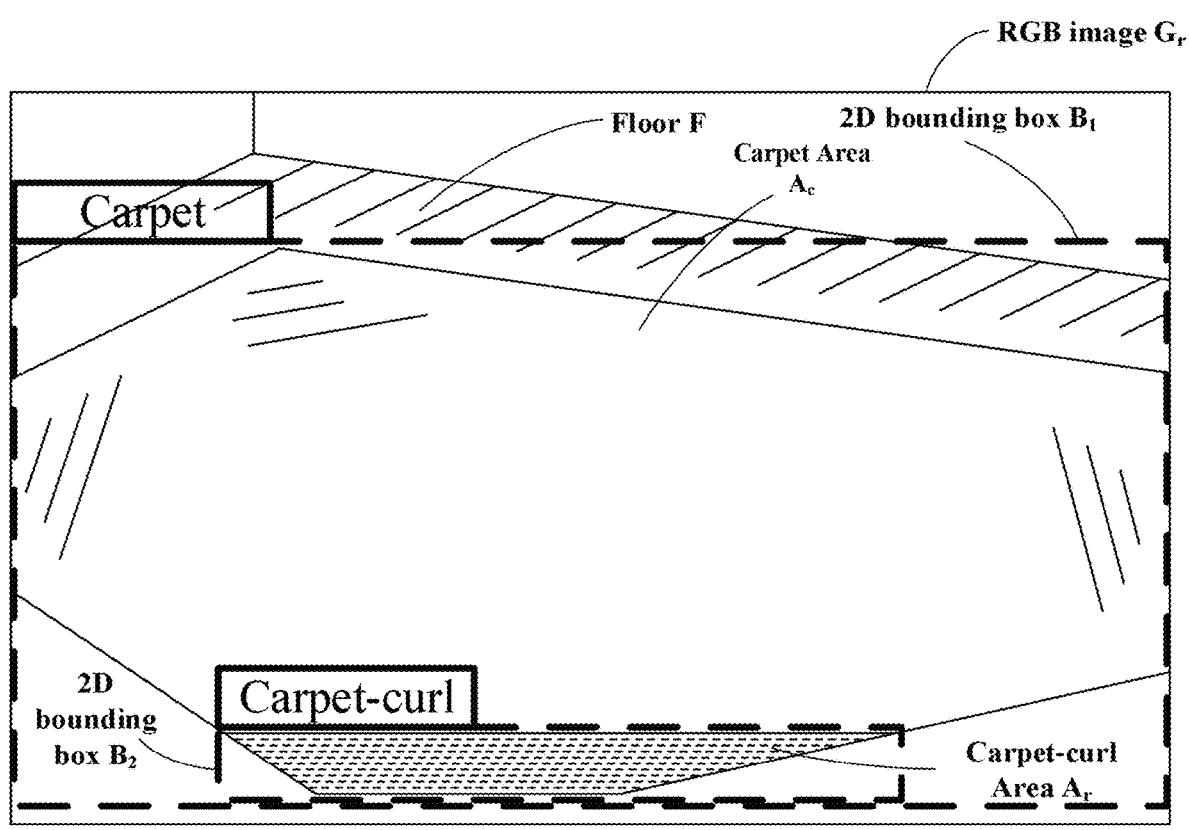
FIG. 3B is a schematic diagram of an RGB image of the scenario of FIG. 1A.

FIG. 3A is a schematic block diagram of an example of carpet detection performed by the mobile machine 100 of FIG. 2A. In some embodiments, a carpet detection method for the mobile machine 100 to detect carpets is implemented in the mobile machine 100 by, for example, storing (sets of) the instructions $I_n$ corresponding to the carpet detection method as the navigation module 121 in the storage unit 120 and executing the stored instructions $I_n$ through the processing unit 110, and then the mobile machine 100 can detect carpets using the RGB-D camera C. The carpet detection method may be performed in response to, for example, a request for detecting carpets and/or carpet-curls from, for example, (the navigation/operation system of) the mobile machine 100 itself or the control device 200, then it may also be re-performed, for example, after each directional change of the mobile machine 100 (e.g., after the movement of the pose $S_5$ in the trajectory $T_2$ according to FIG. 1A). According to the carpet detection method, the processing unit 110 may obtain RGB-D image pair(s) G through the RGB-D camera C (block 310 of FIG. 3A). Each RGB-D image pair G includes an RGB image $G_r$ and a depth image $G_d$ corresponding to the RGB image $G_r$. One or more RGB-D image pairs G may be obtained so as to, for example, select one RGB-D image pair G (e.g., a qualified RGB-D image pair G that meets a certain quality) for use. FIG. 3B is a schematic diagram of the RGB image $G_r$ of the scenario of FIG. 1A. The RGB image $G_r$ includes a red channel, a green channel, and a blue channel that are for representing the colors of scene objects (e.g., the carpet $C_c$ and the floor F) in the RGB image $G_r$, and the depth image $G_d$ includes data for representing the distance to the scene objects in the depth image $G_d$.

In the carpet detection method, the processing unit 110 may further use a first deep learning model $M_1$ to detect carpet areas $A_c$ in the RGB image $G_r$ of the RGB-D image pair(s) G and generate a first 2D bounding box (Bbox) $B_1$ (which may have a label such as "Carpet") to mark each carpet area $A_c$ (block 320 of FIG. 3A). The first deep learning model $M_1$ is a computer model based on, for example, YOLO algorithm, which is trained by using a large set of labeled data, that is, first data set $D_1$ containing a carpet class, and neural network architectures that contain a plurality of layers, so as to learn to perform classification tasks directly from the inputted RGB $G_r$ image, thereby detecting carpel areas $A_c$ in the RGB $G_r$ image. The first data set $D_1$ is, for example, more than 10,000 images of carpets in various scenes. The processing unit 110 may further use a second deep learning model $M_2$ to detect carpet-curl areas $A_r$ in the RGB image $G_r$ of the RGB-D image pair(s) G and generate a second 2D bounding box $B_2$ (which may have a label such as "Carpet-curl") to mark each carpet-curl area $A_r$ (block 330 of FIG. 3A). The second deep learning model $M_2$ is at computer model based on, for example, YOLO algorithm, which is trained by using a large set of labeled data, that is, the second data set $D_2$ containing a carpet-curl class, and neural network architectures that contain a plurality of layers, so as to learn to perform classification tasks directly from the inputted RGB $G_r$ image, thereby detecting carpet-curl area $A_r$ in the RGB $G_r$ image. The second data set $D_2$ is, for example, more than 10,000 images of carpet-curls in various scenes.

It should be noted that, carpet and carpet-curls are regarded as two independent classes in the data sets for training the deep learning models. The first data set $D_1$ may include images from the COCO (common objects in context) data set that contain carpets, rugs, and mats. In addition, the first data set $D_1$ may also include an office-collected data set containing the carpet class. The second data set $D_2$ may include an office-collected data set containing the carpet-curl class. The data engineering technologies such as adding noise, flip, gray-scale, and shrink of the original images may also be applied on the data sets to balance the annotation instance number of carpets and carpet-curls. The first deep learning model $M_1$ and the second deep learning model $M_2$ may be trained based on the algorithm of YOLO v4 tiny using the above-mentioned data sets, which output the first 2D bounding box $B_1$ for the carpet area $A_c$ and the second 2D bounding box $B_2$ for the carpet-curl area $A_r$, respectively.

In the carpet detection method, the processing unit 110 may further generate a group of carpet points $P_c$ corresponding to each carpet area $A_c$ in the RGB image $G_r$ of each RGB-D image pair G by matching each pixel of the RGB image $G_r$ within the first 2D bounding box $B_1$ corresponding to the carpet area $A_c$ to each pixel in the depth image $G_d$ of the RGB-D image pair G (block 340 of FIG. 3A). All the pixels of the RGB image $G_r$ within the first 2D bounding box $B_1$ are taken as the detected carpet area $A_c$, hence the group of carpet points $P_c$ that represent the entirety or a part of the detected carpet $C_c$ can be obtained by matching the pixels within the first 2D bounding box $B_1$ to the corresponding pixels in the depth image $G_d$. The processing win 110 may further generate a group of carpet-curl points $P_r$ corresponding to each carpet-curl area $A_r$ in the RGB image $G_r$ of each RGB-D image pair G by matching each pixel of the RGB image $G_r$ within the second 2D bounding box $B_1$ corresponding to the carpet-curl area $A_r$ to each pixel in the depth image $G_d$ of the RGB-D image pair G (block 350 of FIG. 3A). All the pixels of the RGB image $G_r$ within the second 2D bounding box $B_2$ are taken as the detected carpet-curl area $A_r$, hence the group of carpet-curl points $P_r$ that represent the entirety or a part of the detected carpet-curl $C_r$ can be obtained by matching the pixels within the second 2D bounding box $B_2$ to the corresponding pixels in the depth image $G_d$.

The carpet area detection (i.e, block 320 of FIG. 3A) and the carpet point group generation (i.e., block 340 of FIG. 3A) may be performed simultaneously with the carpet-curl area detection (i.e., block 330 of FIG. 3A) and the carpet-curl point group generation (i.e., block 350 of FIG. 3A) by, for example, different threads that may be executed by different processors in the processing unit 110, or by other parallel processing mechanism. In one embodiment, the RGB image $G_r$ of each RGB-D image pair G and the generated first 2D box $B_1$ (which may have a label such as "Carpet") corresponding to each carpet area $A_c$ in the RGB image $G_r$ may be displayed on a display (e.g., a screen) of the mobile machine 100 to mark the carpet area $A_c$, and the generated second 2D box $B_2$ (which may have at label such as "Carpet-curl") corresponding to each carpet-curl area $A_r$ in the RGB image $G_r$ may also be displayed on the display to mark the carpet-curl area $A_r$, thereby showing the detected carpet $C_c$ and the detected carpet-curl $C_r$ to the user U.

Figure 4A:
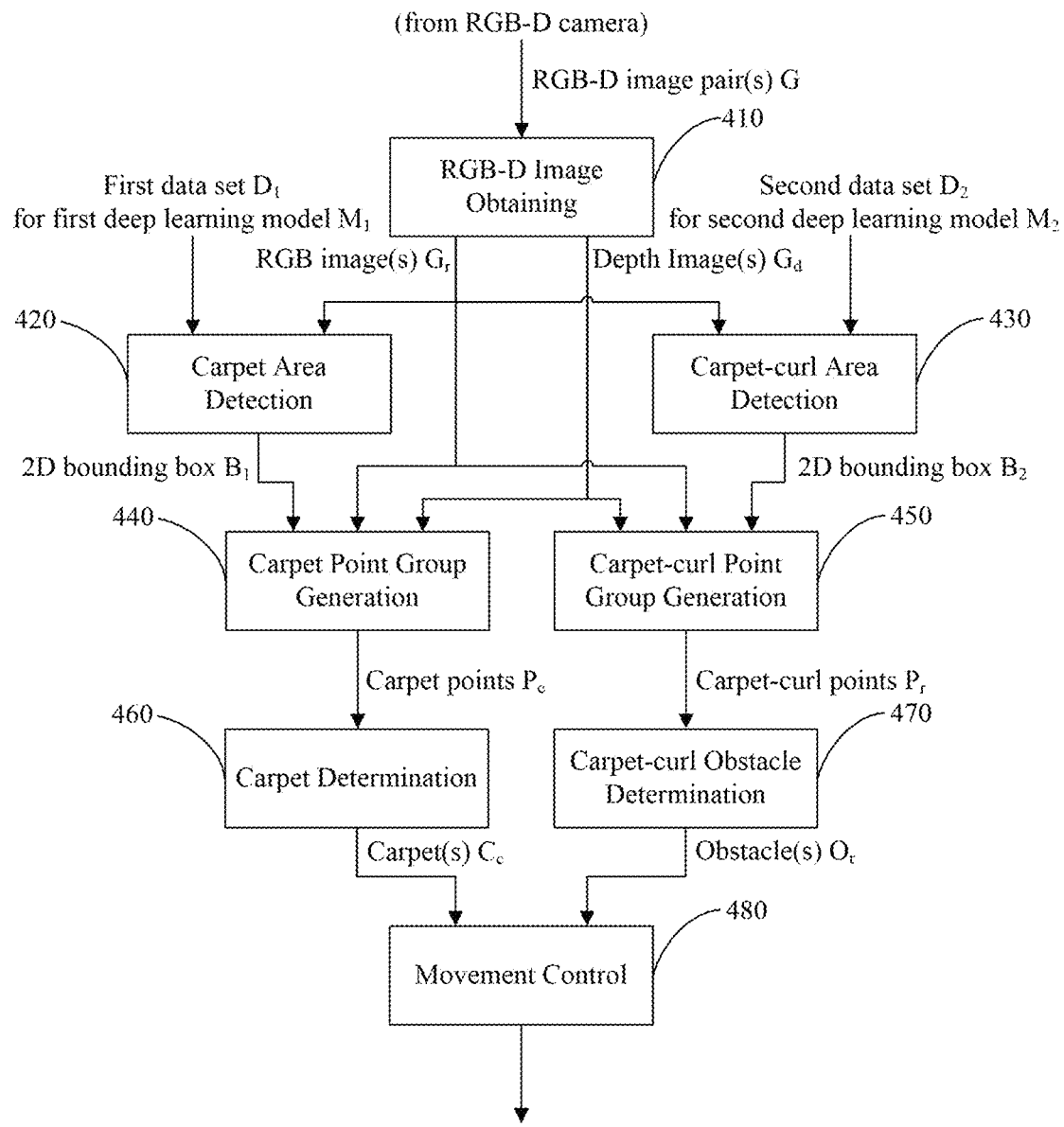
FIG. 4A is a schematic block diagram of an example of movement control of the mobile machine of FIG. 2A.

FIG. 4A is a schematic block diagram of an example of movement control of the mobile machine 100 of FIG. 2A. In some embodiments, a movement control method based eon the above-mentioned carpet detection method (FIG. 3A) is implemented in the mobile machine 100 to navigate the mobile machine 100 by, for example, storing (sets of) the instructions $I_n$ corresponding to the movement control method as the navigation module 121 in the storage unit 120 and executing the stored instructions $I_n$ through the processing unit 110, and then the mobile machine 100 may be navigated. The movement control method may be performed in response to, for example, a request for navigating the mobile machine 100 from, for example, (the navigation/operation system of) the mobile machine 100 itself or the control device 200, and may simultaneously considering the obstacles (e.g., the carpet-curl $C_r$ of the carpet $C_c$, walls, furniture, humans, pets, and garbage) detected through the RGB-D camera C of the mobile machine 100, then it may also be re-performed, for example, after each directional change of the mobile machine 100 (e.g, after the movement of the pose $S_5$ in the trajectory $T_2$ according to FIG. 1A).

Figure 4B:
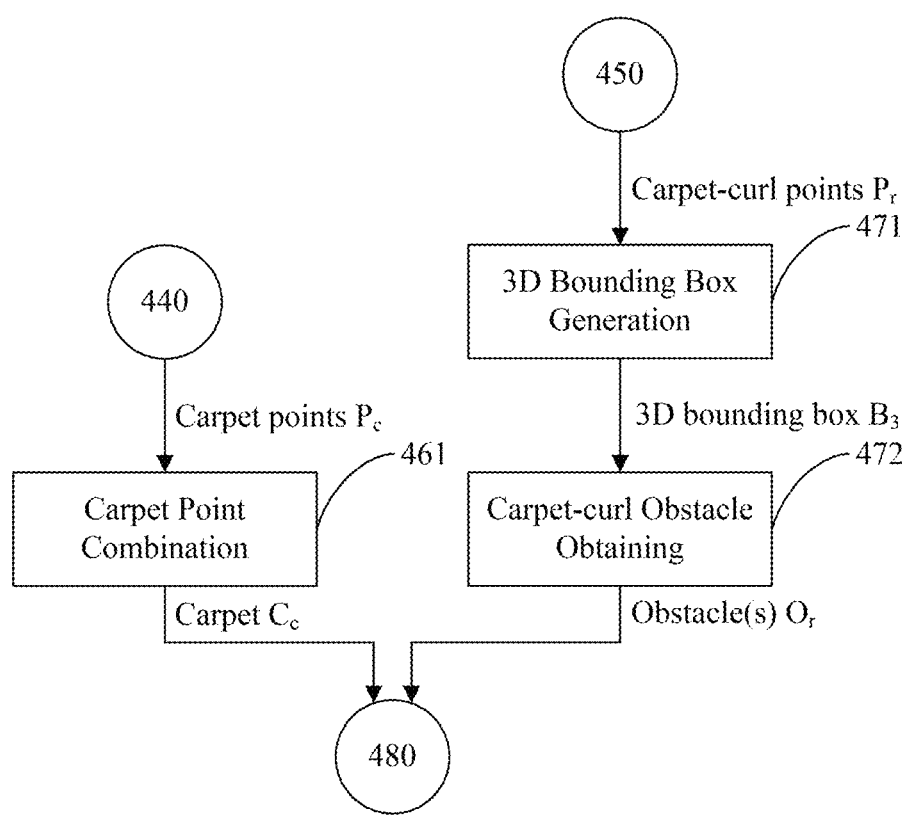
FIG. 4B is a schematic block diagram of an example of determining carpet and carpet-curl in the example of mobile machine movement control of FIG. 4A.

According to the movement control method, in addition to performing the RGB-D image obtaining (block 410 of FIG. 4A) (i.e., block 310 of FIG. 3A), the carpet area detection (block 420 of FIG. 4A) (i.e., block 320 of FIG. 3A), the carpet-curl area detection (block 430 of FIG. 4A) (i.e., block 330 of FIG. 3A), the carpet point group generation (block 440 of FIG. 4A) (i.e., block 340 of FIG. 3A), and the carpet-curl point group generation (block 450 of FIG. 4A) (i.e., block 350 of FIG. 3A) as in the above-mentioned carpet detection method, the processing unit 110 may further take the generated group of carpet points $P_c$ corresponding to each carpet area $A_c$ in the RGB image $G_r$ of each RGB-D image pair G as a carpet $C_c$ (block 460 of FIG. 4A). The generated group of carpet points $P_c$ corresponding to one carpet area $A_c$ is taken as one carpet $C_c$, and the groups of carpet points $P_c$ corresponding to different carpet areas $A_c$ are taken as different carpets $C_c$. The processing unit 110 may further obtain each carpet-curl $C_r$ corresponding to each carpet-curl area $A_r$ in the RGB image $G_r$ of each RGB-D image pair G based on the generated group of carpet-curl points $P_r$ corresponding to each carpet-curl area $A_r$, and take each carpet-curl $C_r$ a (carpet-curl) obstacle $O_r$ (block 470 of FIG. 4A). The carpet-curl $C_r$ corresponding to e carpet-curl area $A_r$ is taken as one obstacle $O_r$, and the carpet-curls $C_r$ corresponding to different carpet-curl areas $A_r$ are taken as different obstacles $O_r$. FIG. 4B is as schematic block diagram of an example of determining carpet and carpet-curl in the example of mobile machine movement control of FIG. 4A. In one embodiment, for performing the carpet determination (i.e., block 460 of FIG. 4A), the processing unit 110 may combine all the generated groups of carpet points $P_c$ into the carpet $C_c$ (block 461 of FIG. 4B). All the generated groups of carpet points $P_c$ are taken as a single carpet. For performing the carpet-curl obstacle determination (i.e., block 470 of FIG. 4A), the processing unit 110 may generate a 3D bounding box $B_3$ to mark the generated group of carpet-curl points $P_r$ corresponding, to each carpet-curl area $A_r$ in the RGB image $G_r$ of each RGB-D image pair G (block 471 of FIG. 4B), and the processing unit 110 may further take the generated 3D bounding box $B_3$ as the obstacle $O_r$ (block 472 of FIG. 4B). By taking the 3D bounding box $B_3$ itself as the obstacle $O_r$, the position (and the orientation) of the obstacle $O_r$ in a 3D coordinate system can he easily obtained to realize collision avoidance. Since each carpet-curl may be regarded as an independent obstacle, the generated groups of carpet-curl points $P_r$ belong to different carpet-curls will not be combined a group all together. The group of carpet-curl points $P_r$ corresponding to one carpet-curl area $A_r$ is marked by one 3D bounding box $B_3$, and the groups of carpet-curl points $P_r$ corresponding to different carpet-curl areas $A_r$ are marked by different 3D bounding boxes $B_3$.

Figure 4C:
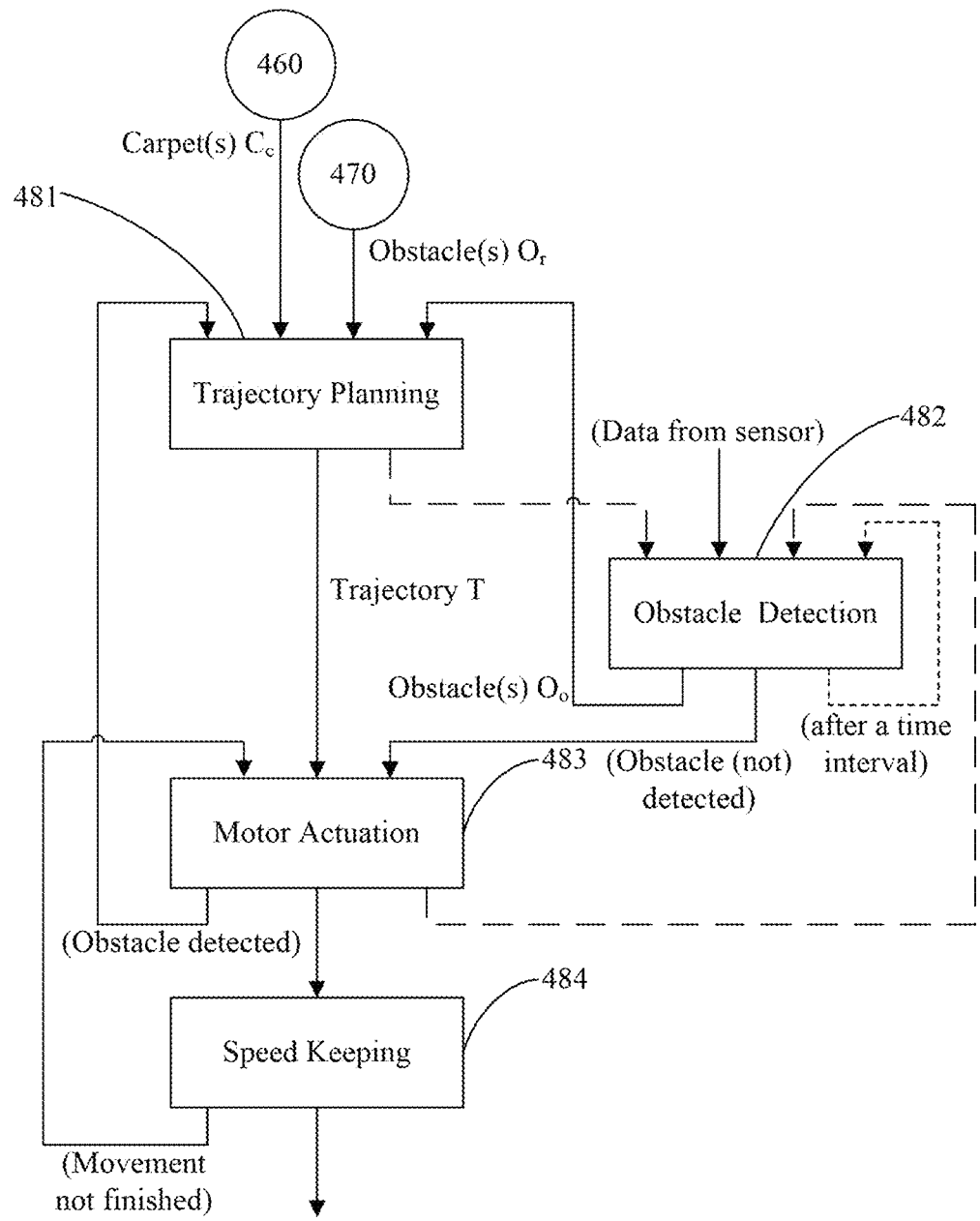
FIG. 4C is a schematic block diagram of an example of movement control in the example of mobile machine movement control of FIG. 4A.

In the carpet detection method, the processing unit 110 may further control the mobile machine 100 to make a movement with reference to the carpet $C_c$ corresponding to each carpet area $A_c$ in the RGB image $G_r$ of each RGB-D image pair G and avoid the obstacle $O_r$ (block 480 of FIG. 4A). FIG. 4C is a schematic block diagram of an example of movement control in the example of mobile machine movement control of FIG. 4A. In one embodiment, for performing the movement control (i.e., block 480 of FIG. 4A), the processing unit 110 may plan a trajectory T that can avoid obstacles (block 481 of FIG. 4C). The obstacles to be avoided maybe the obstacle $O_r$ determined in the carpet-curl obstacle determination (i.e., block 470 of FIG. 4A) and obstacle(s) $O_o$ detected in an obstacle detection (see block 482 of FIG. 4C). The trajectory T includes a sequence of poses (e.g., poses $S_1$-$S_9$ of trajectory $T_2$), and each pose includes a position (e.g., a coordinate in a coordinate system) and a posture (e.g., an Euler angle in the coordinate system) for the mobile machine 100. A relative position of the carpet $C_c$ (or the obstacle to be avoided) with respect to the mobile machine 100 can be obtained according to the height and the pitch angle of the RGB-D camera C, and the corresponding pose in the trajectory T can be obtained based on the relative position. The trajectory may be planned by the above-mentioned global trajectory planner based on map(s) built by the map builder 1211. The trajectory T may be re-planned, for example, upon determining the obstacle $O_r$ (i.e., block 470 of FIG. 4A) or detecting the obstacle $O_o$ (see block 482. of FIG. 4C). The processing unit 110 may further detect the obstacle $O_o$ through sensor(s) in the sensor subunit 133 (block 482 of FIG. 4C). The obstacle detection may be performed after, before or simultaneously with the trajectory planning (i.e., block 481 of FIG. 4C). The obstacle $O_o$ may be detected through one or more sensors (e.g., the RGB-D camera C, the LiDAR $S_l$, and the IRs $S_i$) in the sensor subunit 133. For example, sensor data may be collected through the sensor(s) in the sensor subunit 133, and the collected data may be analyzed so as to identify the obstacle $O_o$ that, for example, appears suddenly or suddenly found while approaching. The sensor data may be collected by different sensors (e.g., the LiDAR $S_l$ and the IRs $S_i$), and a fusion algorithm such as Kalman filter may be used to fuse the sensor data received from the sensors so as to, fur example, reduce uncertainties due to noisy data, to fuse data with different rates, and to combine data for same objects. For example, images (e.g., the RGB images $G_r$ in the obtained RGB-D image pairs G) may be collected through the RGB-D camera C its the sensor subunit 133 and other data may be collected through other sensor such as the LiDAR $S_l$ and the IRs $S_i$ in the sensor subunit 133, then the collected data may be fused to analyze so as to identify the obstacle $O_o$.

The processing unit 110 may further plan local trajectory(s) (e.g., a part of the trajectory $T_2$ that includes poses $S_1$-$S_4$ in FIG. 1A) based on the planned global trajectory, the sensor data collected through the sensor subunit 133 of the mobile machine 100, and the current pose of the mobile machine 100, that is, the pose in the trajectory T at which the mobile machine 100 is currently at. For example, sensor data may be collected through the LiDAR $S_l$ and the IRs $S_i$, and the collected sensor data may be analyzed so as to identify obstacles (e.g., the obstacle $O_o$), so that the local trajectory can be planned with reference to the identified obstacles, and the obstacles can be avoided by moving the mobile machine 100 according to the planned local trajectory. In some embodiments, the local trajectory(s) may be planned through the above-mentioned trajectory planner by generating the local trajectory based on the planned global trajectory while taking the identified obstacles into consideration (e.g., avoiding the identified obstacles). In addition, the obstacle detection may be re-performed, for example, in every predetermined time interval (e.g., 1 second) until all the movement controls according to the planned trajectory T (see block 483 of FIG. 4C) are finished.

For performing the movement control (block 480 of FIG. 4A), the processing unit 110 may further control the mobile machine 100 to move according to the trajectory T by actuating the motor(s) 1321 of the mobile machine 100 according to the trajectory T (block 483 of FIG. 4C). For example, the mobile machine 100 rotate the motor(s) 1321 (and turn the wheels E) according to the trajectory T so that the mobile machine 100 meets the position and the posture at each pose of the trajectory T. The processing unit 110 may further keep the current speed of the mobile machine 100 by adjusting parameter(s) of the motor(s) 1321 in response to the mobile machine 100 being on the carpet $C_c$ (block 484 of FIG. 4C). For example, the processing unit 110 determines that whether the mobile machine 100 has been on the carpet $C_c$ based on the relative position or the carpet $C_c$ with respect to the mobile machine 100 and the current position (e.g., a position obtained through the IMU 1331) of the mobile machine 100 first, and then changes the power ibis actuating the pair(s) 1321 to offset the friction of be carpet C so as to keep the current speed of the mobile machine 100 when the mobile machine 100 is determined as having been on the carpet $C_c$. If the mobile machine 100 has not finished the movement of the last pose in the trajectory T (e.g., the second desired pose $S_{d2}$ in the trajectory $T_2$) after the speed keeping (i.e., block 484 of FIG. 4C), the motor actuation (i.e., block 483 of FIG. 4C) may be re-performed until it finishes the movement of the last pose in the trajectory T.

Figure 5:
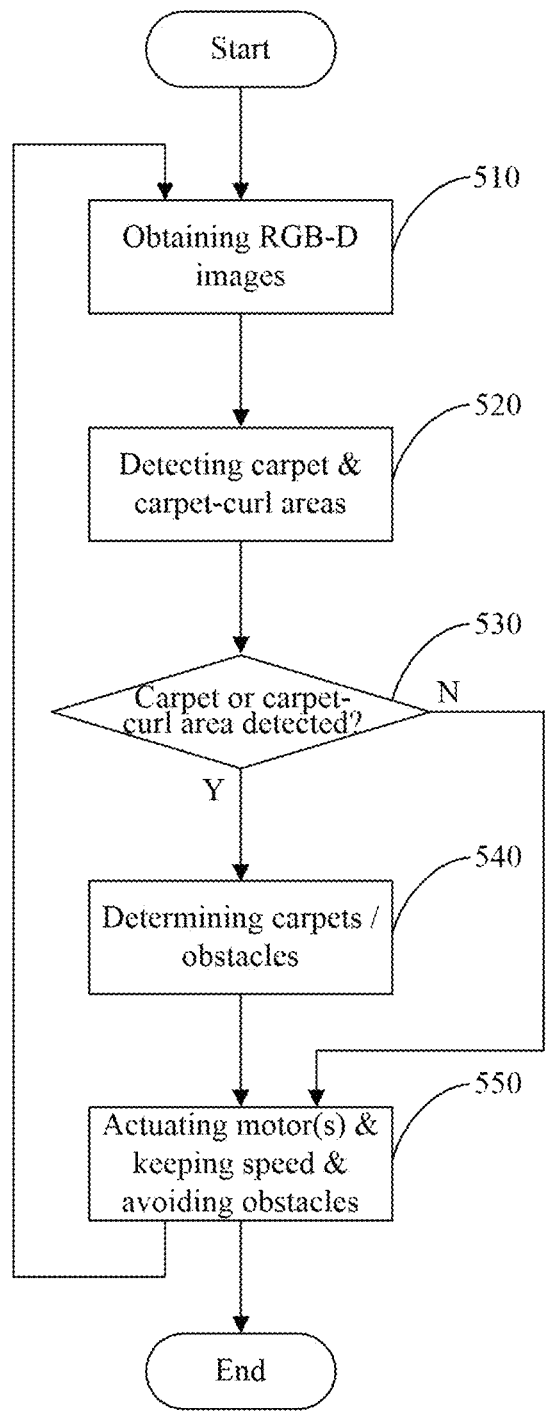
FIG. 5 is a flowchart of a navigation method according to some embodiments of the present disclosure.

FIG. 5 is a flow chart of a navigation method according to some embodiments of the present disclosure. In some embodiments, navigation method may be implemented in the mobile machine 100 so as to navigate the mobile machine 100. Accordingly, at step 510, the RGB-D image, pair(s) G may be obtained through the RGB-D camera C (i.e., block 310 of FIG. 3A). At step 520, the first deep learning model $M_1$ is used to detect the carpet areas $A_c$ in the RGB image $G_r$ of the RGB-D image pair(s) G and generate the first 2D bounding box $B_1$ to mark each carpet area $A_c$ (i.e., block 320 of FIG. 3A), and the second deep learning model $M_2$ is used to detect the carpet-curl areas $A_r$ in the RGB image $G_r$ of the RGB-D image pair(s) G and generate the second 2D bounding box $B_2$ to mark each carpet-curl area $A_r$ (i.e., block 330 of FIG. 3A). At step 530, a determination is made whether or not there is a carpet area $A_c$ or a carpet-curl area $A_r$ having been detected.

If it is determined that a carpet area $A_c$ or a carpet-curl area $A_r$ has been detected, step 540 will be performed; otherwise, step 550 will be performed. At step 540, the group of carpet points $P_c$ corresponding to each carpet area $A_c$ in the RGB image $G_r$ of each RGB-D image pair G is generated by matching each pixel of the RGB image $G_r$ within the first 2D bounding box $B_1$ corresponding to the carpet area $A_c$ to each pixel in the depth image $G_d$ of the RGB-D image pair G (i.e., block 340 of FIG. 3A), the group of carpet-curl points $P_r$ corresponding to each carpet-curl area $A_r$ in the RGB image G of each RGB-D image pair G is generated by matching each pixel of the RGB image G within the second 2D bounding box $B_1$ corresponding to the carpet-curl area $A_r$ to each pixel in the depth image $G_d$ of the RGB-D image pair G (i.e., block 350 of FIG. 3A), each carpet-curl $C_r$ corresponding to each carpet-curl area $A_r$ in the RGB image $G_r$ of each RGB-D image pair G is obtained based on the generated group of carpet-curl points $P_r$ corresponding to each carpet-curl area $A_r$, and each carpet-curl $C_r$ is taken as an obstacle $O_r$ (i.e., block 470 of FIG. 4A). At step 550, the trajectory T that can avoid obstacles is planned (i.e., block 481 of FIG. 4C), the mobile machine 100 is controlled to move according, to the planned trajectory T by actuating the motor(s) 1321 of the mobile machine 100 according to the trajector T (i.e., block 483 of FIG. 4C), and the current speed of the mobile machine 100 is kept by adjusting parameter(s) of the motor(s) 1321 its response to the mobile machine 100 being on the carpet $C_c$ (i.e., block 484 of FIG. 4C). The obstacles to be avoided in the trajectory T may include the obstacle $O_r$ determined at step 540 and the obstacle(s) $O_o$ detected through sensor(s) in the sensor subunit 133 (i.e., block 482 of FIG. 4C). After step 550, if the mobile machine 100 has finished the movement of the last pose in the trajectory T (e.g., the second desired pose $S_{d2}$ in the trajectory $T_2$), the method is ended and the navigation of the mobile machine 100 is finished; otherwise, the method (i.e., step 510 and its following steps) will be re-performed. The method may be re-performed after, for example, each directional change of the mobile machine 100 (e.g., after the movement of the pose $S_5$ in the trajectory $T_2$ according to FIG. 1A). It should be noted that, by re-performing the method after each directional change of the mobile machine 100, the carpet $C_c$ and the carpet-curl $C_r$ of a different angle may be obtained through the newly obtained RGB-D image pair(s) G, hence the relative position with respect to the mobile machine 100 may be updated accordingly.

As can be seen in the above-mentioned navigation method, the carpet $C_c$ and the carpet-curl $C_r$ will be detected before and during the movement or the mobile machine 100, so that the speed of the mobile machine 100 can be kept when the mobile machine 100 is moved on the carpet $C_c$ while the carpet-curl $C_r$ that is taken as the obstacle $O_r$ can be avoided. The method is simple because it only includes a few steps that without complex computations while only the RGB-D camera C that is economic is needed to detect the carpet $C_c$ and the carpet-curl $C_r$ in the method, hence the detections of the carpet $C_c$ and the carpet-curl $C_r$ can be performed in a real-time manner while a few costs is needed. In comparison with the existing navigation method, the stability and the safety of the movement of the mobile machine 100 in a scenario with carpets is effectively improved.

It can be understood by those skilled in the art that, all or part of the method in the above-mentioned embodiment(s) can be implemented one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned carpet detection method and mobile machine 100 may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interface/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A carpet detection method, comprising:
obtaining, through an RGB-D camera, one or more RGB-D image pairs, wherein each RGB-D image pair comprises and RGB image and a depth image, and the depth image comprises data for representing a distance to scene objects in the depth image;
detecting one or more carpet areas in the RGB image of the one or more RGB-D image pairs and generating a first 2D bounding box to mark each of the one or more carpet areas using a first deep learning model based on a first data set containing a carpet class, wherein the first data set comprises a plurality of images of carpets in various scenes;
detecting one or more carpet-curl areas in the RGB image of the one or more RGB-D image pairs and generating a second 2D bounding box to mark each of the one or more carpet-curl areas using a second deep learning model based on a second data set containing a carpet-curl class, wherein the second data set comprises a plurality of images of carpet-curls in various scenes;
generating a group of carpet points corresponding to each of the one or more carpet areas in the RGB image of each of the one or more RGB-D image pairs by matching each pixel of the RGB image within the first 2D bounding box corresponding to the carpet area to each pixel in the depth image of the RGB-D image pair;
generating a group of carpet-curl points corresponding to each of the one or more carpet-curl areas in the RGB image of each of the one or more RGB-D image pairs by matching each pixel of the RGB image within the second 2D bounding box corresponding to the carpet-curl area to each pixel in the depth image of the RGB-D image pair; and
controlling a mobile machine to move and avoid one or more carpet-curls, according to the generated group of carpet points corresponding to each of the one or more carpet areas in the RGB image of each of the one or more RGB-D image pairs, and the generated group of carpet-curl points corresponding to each of the one or more carpet-curl areas in the RGB image of each of the one or more RGB-D image pairs.

2. The method of claim 1, wherein controlling the mobile machine to move and avoid the one or more carpet-curls, according to the generated group of carpet points corresponding to each of the one or more carpet areas in the RGB image of each of the one or more RGB-D image pairs, and the generated group of carpet-curl points corresponding to each of the one or more carpet-curl areas in the RGB image of each of the one or more RGB-D image pairs comprises:
taking the generated group of carpet points corresponding to each of the one or more carpet areas in the RGB image of each of the one or more RGB-D image pairs as a carpet;

obtaining the one or more carpet-curls each corresponding to each of the one or more carpet-curl areas in the RGB image of each of the one or more RGB-D image pairs based on the generated group of carpet-curl points corresponding to each of the one or more carpet-curl areas, and take each of the one or more carpet-curls as an obstacle; and controlling the mobile machine to make a movement with reference to the carpet corresponding to each of the one or more carpet areas in the RGB image of each of the one or more RGB-D image pairs and avoid the obstacle.

3. The method of claim 2, further comprising:
generating a 3D bounding box to mark the generated group of carpet-curl points corresponding to each of the one or more carpet-curl areas in the RGB image of each of the one or more RGB-D image pairs; and
taking the generated 3D bounding box as the obstacle.

4. The method of claim 1, wherein the method further comprises:
planing a trajectory, and controlling the mobile machine to move and avoid obstacles according to the trajectory, wherein the obstacles comprise the one or more carpet-curls, and an obstacle detected by fusing sensor data received from different sensors of the mobile machine.

5. The method of claim 4, wherein the method further comprises:
in response to each directional change of the mobile machine, returning to perform the step of obtaining, through an RGB-D camera, the one or more RGB-D image pairs.

6. A method for controlling a mobile machine having an RGB-D camera to move, comprising:
at least one or more processors of the mobile machine, obtaining, through the RGB-D camera, one or more RGB-D image pairs, wherein each RGB-D image pair comprises an RGB image and a depth image, and the depth image comprises data for representing a distance to scene objects in the depth image;
detecting one or more carpet areas in the RGB image of the one or more RGB-D image pairs and generating a first 2D hounding box to mark each of the one or more carpet areas using a first deep learning model based on a first data set containing a carpet class, wherein the first data set comprises a plurality of images of carpets in various scenes;
detecting one or more carpet-curl areas in the RGB image of the one or more RGB-D image pairs and generating a second 2D bounding box to mark each of the one or more carpet-curl areas using a second deep learning model based on a second data set containing a carpet-curl class, wherein the second data set comprises a plurality of images of carpet-curls in various scenes;
generating a group of carpet points corresponding to each of the one or more carpet areas in the RGB image of each of the one or more RGB-D image pairs by matching each pixel of the RGB image within the first 2D bounding box corresponding to the carpet area to each pixel in the depth image of the RGB-D image pair;
generating a group of carpet-curl points corresponding to each of the one or more carpet-curl areas in the RGB image of each of the one or more RGB-D image pairs by matching each pixel of the RGB image within the second 2D bounding box corresponding to the carpet-curl area to each pixel in the depth image of the RGB-D image pair;

taking the generated group of carpet points corresponding to each of the one or more carpet areas in the RGB image of each of the one or more RGB-D image pairs as a carpet;
obtaining one or more carpet-curls each corresponding to each of the one or more carpet-curl areas in the RGB image of each of the one or more RGB-D image pairs based on the generated group of carpet-curl points corresponding to each of the one or more carpet-curl areas, and taking each of the one or more carpet-curls as an obstacle; and
controlling the mobile machine to make a movement with reference to the carpet corresponding to each of the one or more carpet areas in the RGB image of each of the one or more RGB-D image pairs and avoid the obstacle.

7. The method of claim 6, wherein the taking the group of carpet points corresponding to each of the one or more carpet areas in the RGB image of each of the one or more RGB-D image pairs as the carpet comprises:
combining all the generated groups of carpet points into the carpet; and
the controlling the mobile machine to make the movement with reference to the carpet corresponding to each of the one or more carpet areas in the RGB image of each of the one or more RGB-D image pairs and avoid the obstacle comprises:
controlling the mobile machine to make the movement with reference to the combined carpet and avoid the obstacle.

8. The method of claim 6, wherein the obtaining the one or more carpet curls each corresponding to each of the one or more carpet-curl areas in the RGB image of each of the one or more RGB-D image pairs based on the group of carpet-curl points, and taking each of the one or more carpet-curls as the obstacle comprises:
generating a 3D bounding box to mark the generated group of carpet-curl points corresponding to each of the one or more carpet-curl areas in the RGB image of each of the one or more RGB-D image pairs; and
taking the generated 3D bounding box as the obstacle.

9. The method of claim 6, wherein the controlling the mobile machine to make the movement with reference to the carpet and avoid the obstacle comprises:
planning a to avoiding the obstacle;
controlling the mobile machine to move according to the trajectory by actuating one or more motors of the mobile machine according to the trajectory; and
keeping a current speed of the mobile machine by adjusting one or more parameters of the one or more motors in response to the mobile machine being on the carpet.

10. The method of claim 6, wherein the first deep learning model and the second deep learning model are based on YOLO algorithm.

11. The method of claim 10, wherein the first deep learning model is trained using the first data set comprising a COCO data set.

12. A mobile machine, comprising:
an RGB-D camera;
one or more processors; and
memory storing one or more programs configured to be executed by the one or more processors, wherein the one or more programs include instructions to:

obtain, through an RGB-D camera, one or more RGB-D image pairs, wherein each RGB-D image pair comprises an RGB image and a depth image;

detect one or more carpet areas in the RGB image of the one or more RGB-D image pairs and generate a first 2D bounding box to mark each of the one or more carpet areas using a first deep learning model based on a first data set containing a carpet class, wherein the first data set comprises a plurality of images of carpets in various scenes;

detect one or more carpet-curl areas in the RGB image of the one or more RGB-D image pairs and generate a second 2D bounding box to mark each of the one or more carpet-curl areas using a second deep learning model based on a second data set containing a carpet-curl class, wherein the second data set comprises a plurality of images of carpet-curls in various scenes;

generate a group of carpet points corresponding to each of the one or more carpet areas in the RGB image of each of the one or more RGB-D image pairs by matching each pixel of the RGB image within the first 2D bounding box corresponding to the carpet area to each pixel in the depth image of the RGB-D image pair;

generate a group of carpet-curl points corresponding to each of the one or more carpet-curl areas in the RGB image of each of the one or more RGB-D image pairs by matching each pixel of the RGB image within the second 2D bounding box corresponding to the carpet-curl area to each pixel in the depth image of the RGB-D image pair; and control the mobile machine to move and avoid one or more carpet-curls, according to the generated group of carpet points corresponding to each of the one or more carpet areas in the RGB image of each of the one or more RGB-D image pairs, and the generated group of carpet-curl points corresponding to each of the one or more carpet-curl areas in the RGB image of each of the one or more RGB-D image pairs.

13. The mobile machine of claim 12, the one or more programs further include instructions to:

take the generated group of carpet points corresponding to each of the one or more carpet areas in the RGB image of each of the one or more RGB-D image pairs as a carpet;

obtain one or more carpet-curls each corresponding to each of the one or more carpet-curl areas in the RGB image of each of the one or more RGB-D image pairs based on the generated group of carpet-curl points corresponding to each of the one or more carpet-curl areas, and take each of the one or more carpet-curls as an obstacle; and control the mobile machine to make a movement with reference to the carpet corresponding to each of the one or more carpet areas in the RGB image of each of the one or more RGB-D image pairs and avoid the obstacle.

14. The mobile machine of claim 13, wherein the taking the group of carpet points corresponding to each of the one or more carpet areas in the RGB image of each of the one or more RGB-D image pairs as the carpet comprises:

combining all the generated groups of carpet points into the carpet; and the controlling the mobile machine to make the movement with reference to the carpet corresponding to each of the one or more carpet areas in the RGB image of each of the one or more RGB-D image pairs and avoid the obstacle comprises:

controlling the mobile machine to make the movement with reference to the combined carpet and avoid the obstacle.

15. The mobile machine of claim 14, wherein the controlling the mobile machine to make the movement with reference to the carpet and avoid the obstacle comprises:

planning a trajectory avoiding the obstacle;

controlling the mobile machine to move according to the trajectory by actuating one or more motors of the mobile machine according to the trajectory; and keeping a current speed of the mobile machine by adjusting one or more parameters of the one or more motors in response to the mobile machine being on the carpet.

16. The mobile machine of claim 13, the obtaining the one or more carpet-curls each corresponding to each of the one or more carpet-curl areas in the RGB image of each of the one or more RGB-D image pairs based on the group of carpet-curl points, and taking each of the one or more carpet-curls as the obstacle comprises:

generating, a 3D bounding box to mark the generated group of carpet-curl points corresponding to each of the one or more carpet-curl areas in the RGB image of each of the one or more RGB-D image pairs; and taking the generated 3D bounding box as the obstacle.

17. The mobile machine of claim 12, the one or more programs further include instructions to:

display the RGB image of each of the one or more RGB-D image pairs and the generated first 2D box corresponding to each of the one or more carpet areas in the RGB image for marking the carpet area on a display of the mobile machine.

18. The mobile machine of claim 12, the one or more programs further include instructions to:

display the RGB image of each of the one or more RGB-D image pairs and the generated second 2D box corresponding to each of the one or more carpet-curl areas in the RGB image for marking the carpet-curl area on a display of the mobile machine.

19. The mobile machine of claim 12, wherein the first deep learning model and the second deep learning model are based on YOLO algorithm.

20. The mobile machine of claim 12, wherein the first deep learning model is trained using the first data set comprising a COCO data set.

* * * * *